May 1, 1956 — C. C. HAMILTON — 2,743,850
MATERIAL AGITATING AND FEED RATE CONTROLLING SCREW
ARRANGEMENT FOR FEEDER HOPPERS
Filed Nov. 29, 1952 — 4 Sheets-Sheet 1
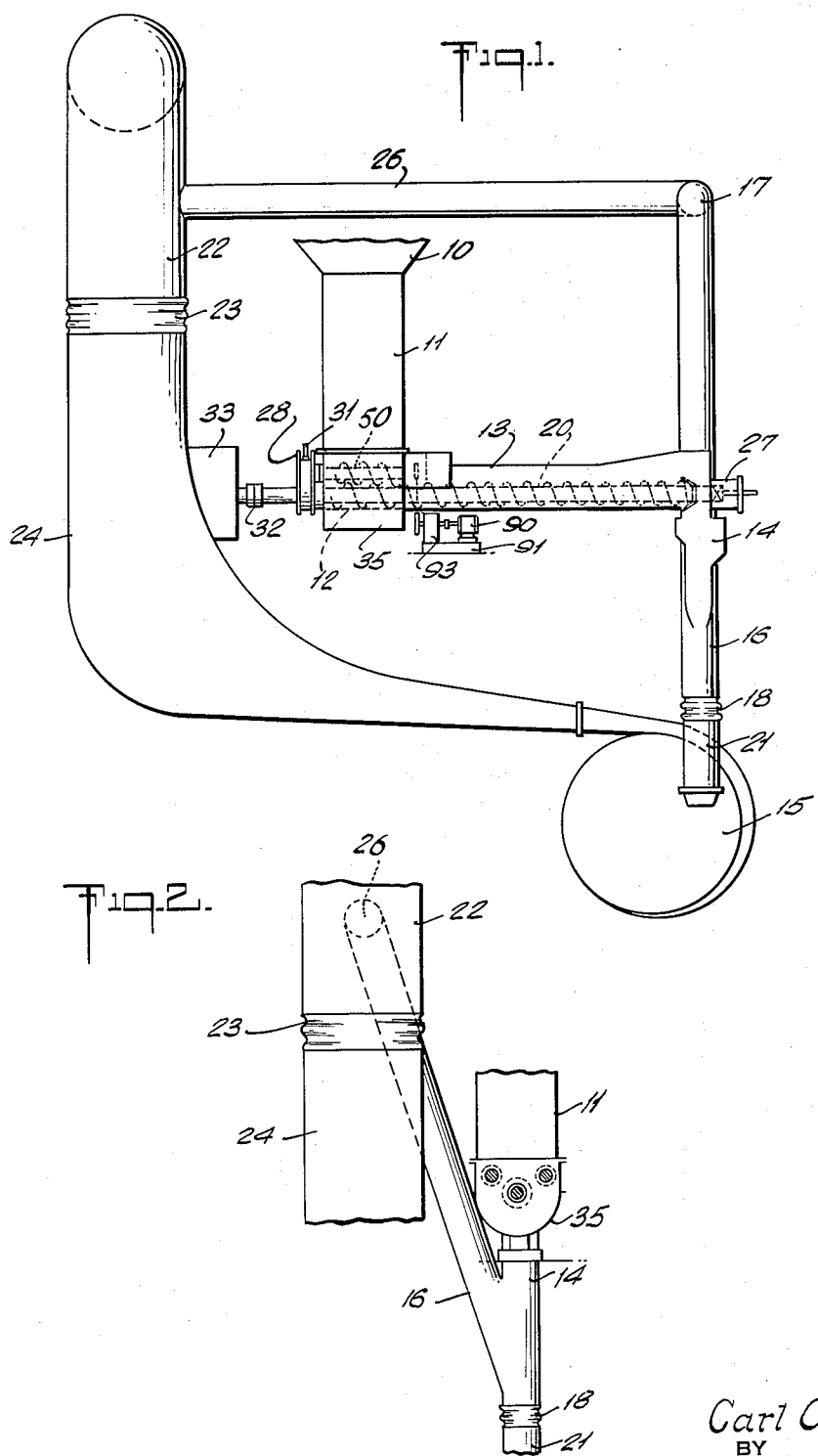
INVENTOR
Carl C. Hamilton
BY
J. P. Moran
ATTORNEY May 1, 1956
C. C. HAMILTON
2,743,850
MATERIAL AGITATING AND FEED RATE CONTROLLING SCREW
ARRANGEMENT FOR FEEDER HOPPERS
Filed Nov. 29, 1952
4 Sheets-Sheet 2
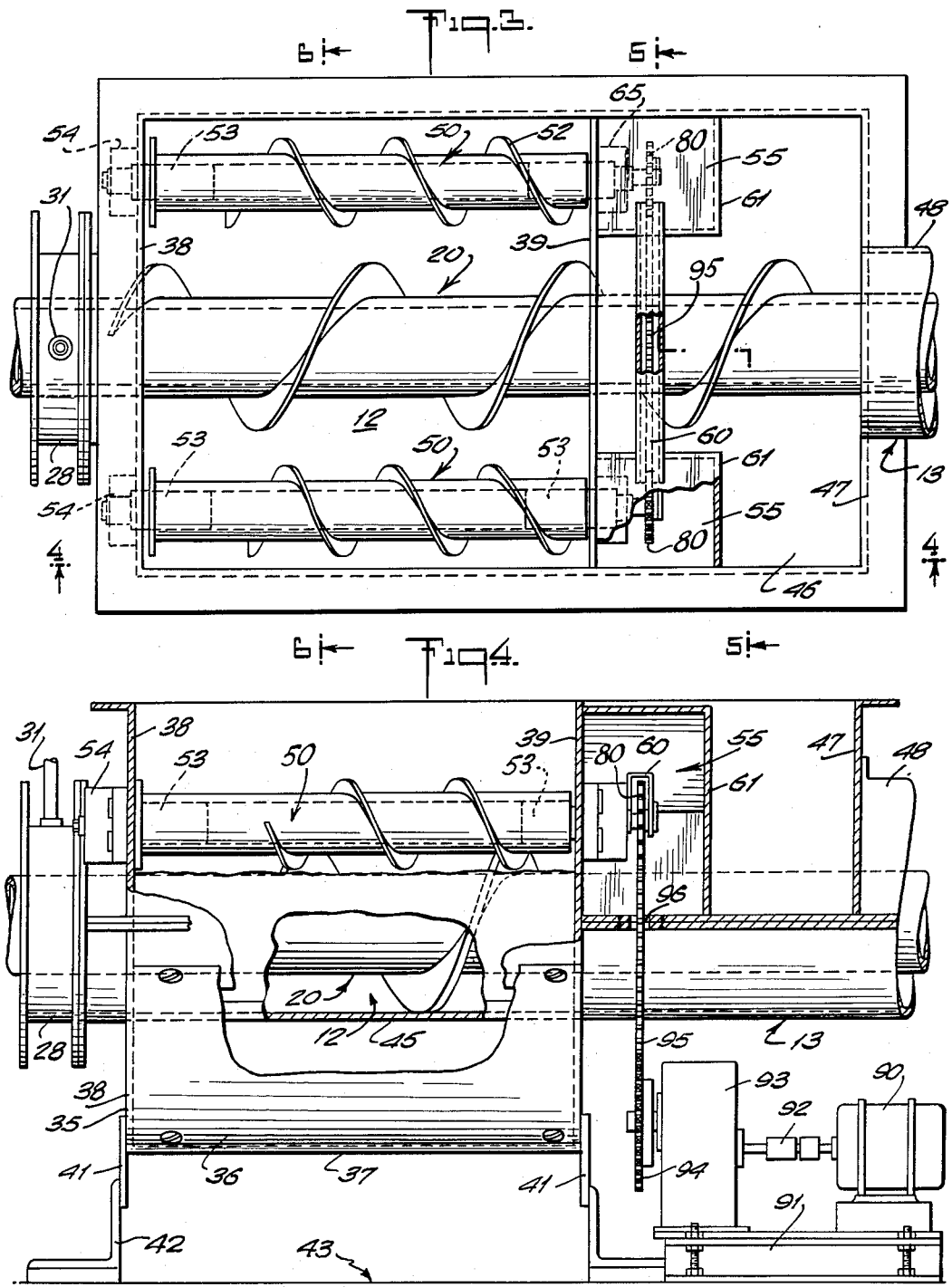
INVENTOR
Carl C. Hamilton
BY
J. P. Moran
ATTORNEY

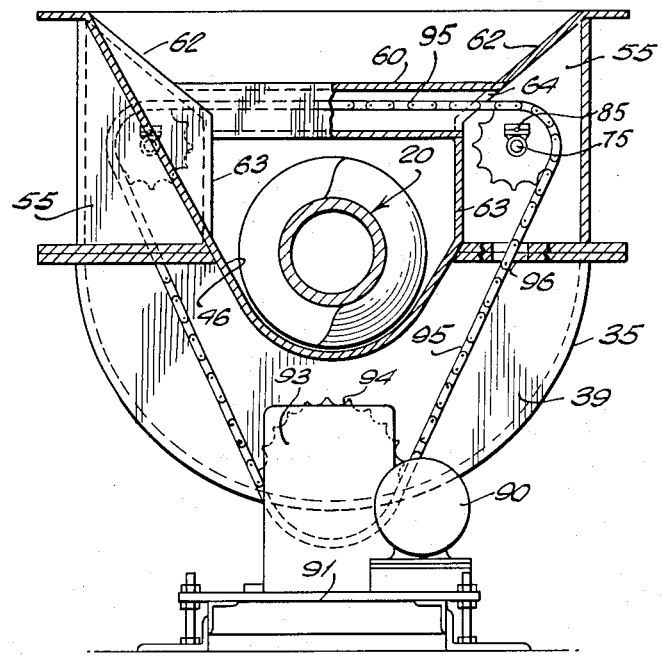
Fig. 5.
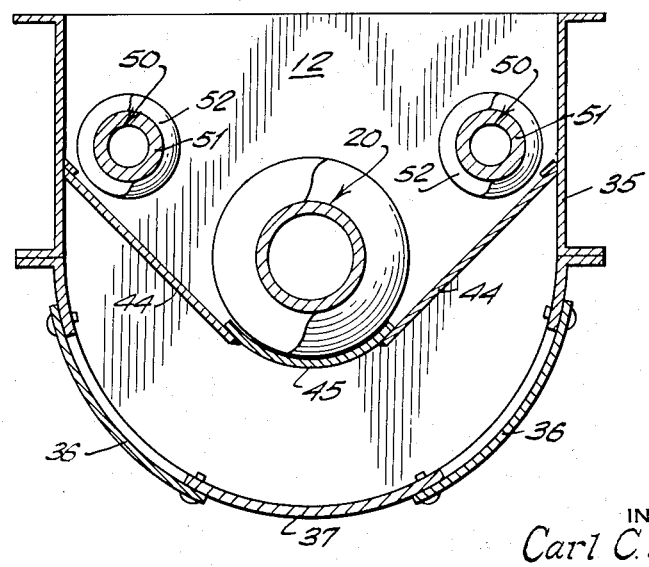
Fig. 6.
INVENTOR
Carl C. Hamilton
BY
ATTORNEY

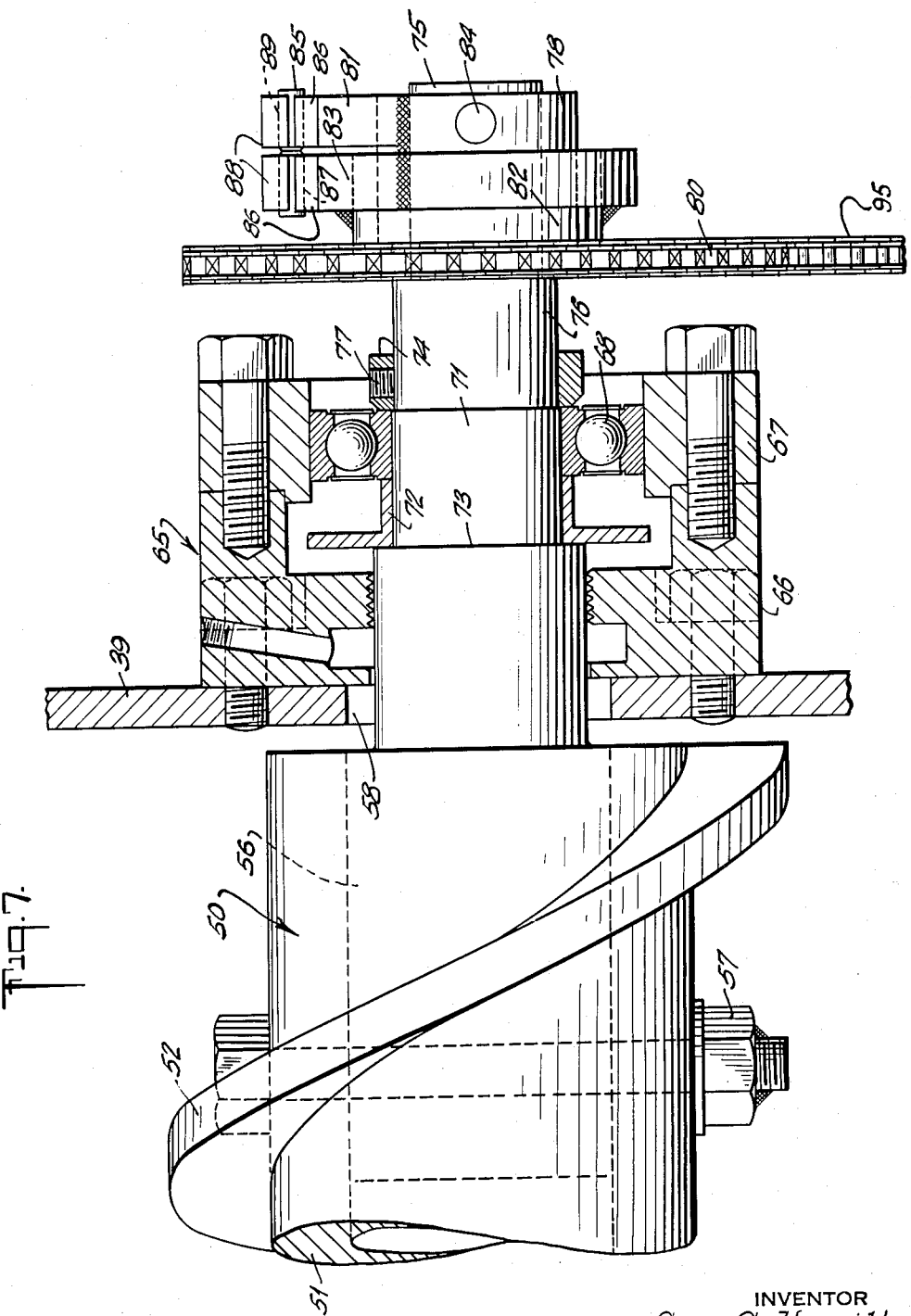

United States Patent Office 2,743,850
Patented May 1, 1956

2,743,850

MATERIAL AGITATING AND FEED RATE CONTROLLING SCREW ARRANGEMENT FOR FEEDER HOPPERS

Carl C. Hamilton, Cuyahoga Falls, Ohio, assignor to The Babcock & Wilcox Company, New York, N. Y., a corporation of New Jersey Application November 29, 1952, Serial No. 323,259

4 Claims. (Cl. 222—238)

This invention relates to feeding apparatus for compactible material, such as powdered coal, and, more particularly, to improved agitating means for breaking up such compactible material for more ready and uniform feeding thereof.

A typical arrangement for feeding such compactible material, from a source of supply to another point spaced therefrom, involves a hopper for containing the material and having a bottom opening leading to a relatively elongated feed trough along which extends a movable feeding means. This feeding means may, for example, be a rotatably mounted screw feeder, an endless chain, an endless belt, or other equivalent means. In normal operation, the weight of the upper portions of the material is sufficient to force the lower portions along the converging trough walls and on to the feeder means for ready removal thereby.

However, under certain conditions, such as relatively high moisture content or freezing of moisture in the material, and other conditions, the compactible material may pack or solidify to such an extent as to resist the weight of the upper layers tending to move the material toward the feeder means. In practice, the material sometimes forms a relatively solid arch or tunnel over the feeder means.

For uniform feeding rates, and for continuity of operation, it is necessary to assure that the compactible material is continuously supplied to the feeder means. For this reason, various forms of agitators have been proposed for stirring or breaking up the material in the trough, at least adjacent the feeder means, so that it will flow readily downward toward the feeder means. However, agitating devices hitherto used for this purpose have not proven fully satisfactory for this purpose.

In accordance with the present invention, a novel agitating means is provided whereby assurance of satisfactory breaking up of compactible material is obtaned and, in addition, the feeding rate of the main feeder may be selectively augmented or diminished at will. The invention agitator means comprises a pair of auxiliary screws rotatably mounted in the hopper and extending in generally parallel, somewhat spaced relation to the main feeder means on either side thereof, and preferably somewhat above the feeder means. These auxiliary screws may be driven either from the driving means for the main feeder or, and preferably, by an independent driving means conjointly rotating both screws and preferably having variable speed and reversibility characteristics.

The rotation of the auxiliary screws has the advantageous effects not only of displacing the material transversely of the screw axis but also of displacing it longitudinally of the screw axis. Thus, a dual direction agitating effect is obtained as compared with the single directional agitating effect obtainable with agitators of the pinned shaft type. Furthermore, by so rotating the auxiliary screws as to feed the material in the same direction as the material is fed by the main feeder, the feeding rate of the latter can be selectively augmented, the degree of increase being controllable by virtue of the selectively variable speed of the auxiliary screws. In a similar manner, the feed rate of the main feeder can be selectively diminished. Thus, not only is an effective agitating means provided for breaking up the compactible material, but also the agitating means may be further utilized to selectively vary the feeding rate of the main feeder.

For an understanding of the invention principles, reference is made to the following description of a typical embodiment thereof, as illustrated in the accompanying drawings. In the drawings:

Fig. 1 is a side elevation view of the invention arrangement as applied to the feeding of crushed coal to a cyclone furnace;

Fig. 2 is a partial end elevation view of the apparatus shown in Fig. 1;

Fig. 3 is a plan view, partly in section, of the main feeder means of the arrangement shown in Figs. 1 and 2, showing the auxiliary screw means of the present invention associated therewith;

Fig. 4 is a vertical sectional view taken on the line 4—4 of Fig. 3;

Figs. 5 and 6 are transverse sectional views taken on the correspondingly numbered lines of Fig. 3; and Fig. 7 is an enlarged elevation view, partly in section, of the driving end of one of the auxiliary screws.

Referring to Figs. 1 and 2, the invention agitating and feed rate controlling means is illustrated as incorporated in a screw feeder arrangement for feeding crushed coal from a hopper 10 to a cyclone furnace 15 associated with a steam generator or heat exchanger, for example, which is not illustrated in the drawings. Hopper 10 has a vertical passage or conduit 11 extending downwardly therefrom to a trough 12, supported in a housing 35, and along which extends a main feeder means, such as a rotatably mounted feed screw 20. The coal in trough 12 is moved longitudinally therealong, to the right as seen in Fig. 1, and along a feed passage 13 connecting with a chute 14, such movement being effected by the rotation of screw 20.

The discharge end of chute 14 is connected into downwardly directed section 16 of a primary air conduit 17, and section 16 is connected, through an expansion joint 18, to the coal inlet 21 to the cyclone furnace 15. The primary and secondary air is supplied, under pressure, through a main conduit 22 connected, through an expansion joint 23, to a secondary air conduit 24 leading to furnace 15. In advance of joint 23, a substantially horizontal inlet section 26 of primary air conduit 17 branches off from conduit 22.

The main feeder screw 20 is rotatably mounted adjacent each end in suitable bearings, such as 27 and 28. An air conduit, such as 31, may be utilized to maintain an air seal in the bearings. The left end of screw 20 is connected through a coupling 32 to a suitable driving means 33, such as an air or electric motor.

The coal delivered by screw 20 to discharge conduit 14 flows into the secondary air stream passing through conduit section 16 and is thereby delivered to cyclone furnace 15, the secondary air being supplied to furnace 15 through the conduit 24. In a manner known to those skilled in the art, the whirling coal and air mixture in cyclone furnace 15 is ignited to provide gaseous products of combustion which flow from the furnace 15 to a heat exchanger, steam generator, or the like associated with the furnace. The molten slag from the burning of the coal is thrown to the walls of furnace 15 and suitably tapped therefrom.

Referring to Figs. 3 through 7, which illustrate the coal feeding means to a larger scale, outer housing 35 is generally U-shaped in cross-section and has removable closure plates 36 on its lower surface 37 whereby access may be obtained to the interior of the housing. The housing 35 includes end walls 38 and 39, having supporting plates 41 welded or otherwise secured thereto by means of which the housing 35 is mounted in angle brackets 42 on a suitable supporting surface 43. One bearing 28 for screw 20 is mounted on the left end wall 38 of housing 35.

The trough 12 includes sloping side plates 44 interconnected at their lower ends by an elongated central plate 45 of arcuate cross-section disposed closely adjacent the periphery of screw 20. The upper ends of plates 44 are suitably secured along the vertical portions of the side walls of housing 35.

The feed passage 13 extends from the end wall 39 in alignment with trough 12, and includes a trough portion 46 having a curved apex closely fitting screw 20. Trough portion 46 terminates at a vertical wall 47 spaced from and parallel to wall 39, where it is continued as longitudinally aligned tubular section 48 having a curved bottom wall closely embracing the screw 20. The passage 13 is progressively enlarged from a point intermediate its ends toward its juncture with chute 14. The screw 20 extends to the entrance to chute 14.

The agitating and feeding rate control means of the invention comprises a pair of auxiliary screws 50 rotatably mounted in trough 12 on either side of main feeder screw 20, and preferably extending parallel thereto and with their axes somewhat above that of feeder screw 20, as may be best seen in Figs. 5 and 6. Each auxiliary screw 50 comprises a hollow tube 51 to the exterior surface of which is welded a helical flight or rib 52. By reference to Fig. 3, it will be noted that the helical flights of both screws 50 extend in the same direction. The left end of each screw 50 has relatively tightly fitted therein a cylindrical plug 53 having a reduced portion extending outwardly through wall 38 and rotatably mounted in a bearing 54 secured to the outer surface of wall 38. The inner portions of plugs 53 are secured to tubes 51 by pins, bolts or the like. In addition, each bearing 54 is provided with a pressure air connection to form an air seal for the bearing.

In the same manner, the right hand, or driving, end of screws 50 have plugs 56 (Fig. 7) substantially tightly fitted therein and secured to rotate with the screws by a diametrically extending bolt and nut arrangement 57. The plugs 56 have successively reduced diameter portions extending outwardly through apertures 58 in wall 39, and into housings 55 adjacent the outer surface of wall 59.

As best seen in Figs. 3, 4 and 5, housings 55 are generally trapezoidal in vertical section, and are located through the side walls of trough portion 46 of discharge passage 13, so that they have a minor portion of their volume projecting into trough portion 46. Each housing 55 includes a trapezoidal vertical wall 61 spaced from and parallel to wall 39, a downwardly and inwardly sloping upper inner wall 62, and a substantially perpendicular lower inner wall 63. Adjacent their juncture, walls 62 and 63 of each housing are formed with a substantially rectangular opening 64 into which openings are secured the opposite ends of a transversely extending driving means housing 60 which is substantially rectangular in cross section. This housing 60 is located above and in spaced relation to screw 20.

The reduced portions of plug 56 extend into bearings generally indicated at 65, and each including an air seal 66 to which air is supplied under pressure and an annular ring 67 which is bolted to the air seal and forms a seat for a roller bearing 68. The latter is seated on a reduced portion 71 of the associated plug 66, having angular protective ring 72 spacing bearing 68 from a shoulder 73 of plug 56. The inner race of the bearing is held against ring 72 and a ring 74 seated on reduced portion 76 and secured thereto by a set screw 77.

Each plug 56 has an outermost reduced portion 75 on which is seated a sleeve 78 having a transversely extending bar 81 welded thereto. A sprocket 80 has a hub 82 seated on sleeve 78 and hub 82 has a transversely extending bar 83 welded thereto. A tapered pin 84 secures sleeve 78 to rotate with plug 56 and thus with screw 50.

The bars 81 and 83 are used to support an overload release or shear pin mechanism for the screws 50. Each overload release includes bars 86 bolted to bars 81 or 83 and each having a cylindrical partial notch 87 in its upper surface. Associated with each bar 86, and detachably secured thereto, is an upper bar 88 having cylindrical notch 89 in its lower surface cooperable with a notch 87. A shear pin 85 is seated in the cooperating notches 87 and 89, and has a reduced, or shear, section intermediate its ends. It will thus be seen that sprocket 80 is drivingly connected to shaft 50 through the shear pin connection, and should the shear pin break, the sprocket 80 may freely rotate on the plug 56.

The driving mechanism for the auxiliary screws 50 includes a reversible, variable speed motor 90 mounted on a suitable base 91 and connected by a coupling 92 to a gear reducer 93. The latter has an output sprocket 94 over which is trained an endless drive chain 95 which passes through opening 96 in the lower side of housing 55, over sprockets 80, and through housing 60. The housings 55, 55, and 60 thus provide a complete enclosure for the driving connections for the auxiliary screws 50.

Normally, motor 90 is operated in a direction and at a speed suitable for agitating the compactible material on either side of and above the main screw feed 50, by virtue of the rotation of auxiliary screws 50. Should it be desired to augment the feed rate of screw 20, this can be effected by suitably selecting the direction and speed of operation of the drive means for screws 50 so that the latter will feed material in the same direction as screw 20 and at a rate sufficient to increase the normal feed rate to the desired feed rate. By similarly controlling the direction and speed of rotation of the auxiliary screws 50, the normal feed rate of screw 20 can be diminished in a controlled manner. Due to the transverse and longitudinal motions simultaneously effected on the compactible material by the auxiliary screws 50, the material is more effectively broken up and agitated than is possible with known types of agitators. The arrangement is simple, easily adapted to existing installations, and fully protected as to the driving connections.

While a specific embodiment of the invention has been shown and described in detail to illustrate the application of the invention principles, it will be understood that the invention may be embodied otherwise without departing from such principles.

What is claimed is:

1. In combination with a feeder hopper constructed and arranged to contain a supply of compactible material and having a discharge trough extending along its bottom, and feeder means extending along the trough to discharge material flowing from the hopper into the trough; agitating means for breaking up the material for readier removal by the feeder means comprising, in combination, a pair of screws rotatably mounted in said trough in substantially parallel relation to said feeder means on either side of the latter; and variable speed, reversible driving means for rotating said screws.

2. In combination with a feeder hopper constructed and arranged to contain a supply of compactible material and having a discharge trough extending along its bottom, and feeder means extending along the trough to discharge material flowing from the hopper into the trough; agitating means for breaking up the material for readier removal by the feeder means comprising, in combination, a pair of screws rotatably mounted in said trough in substantially parallel relation to said feeder means on either side of the latter; and common variable speed, reversible driving means for rotating both of said screws.

3. In combination with a feeder hopper constructed and arranged to contain a supply of compactible material and having a discharge trough extending along its bottom, and a rotatable feed screw extending along the trough to discharge material flowing from the hopper into the trough; agitating means for breaking up the material for readier removal by the feed screw on either side of the latter comprising, in combination, a pair of auxiliary screws rotatably mounted in said trough in substantially parallel relation to said feed screw on either side of the latter; and variable speed, reversible driving means for rotating said auxiliary screws.

4. In combination with a feeder hopper constructed and arranged to contain a supply of compactible material and having a discharge trough extending along its bottom, and a rotatable feed screw extending along the trough to discharge material flowing from the hopper into the trough; agitating means for breaking up the material for readier removal by the feed screw on either side of the latter comprising, in combination, a pair of auxiliary screws rotatably mounted in said trough in substantially parallel relation to said feed screw on either side of and above the latter; common variable speed, reversible driving means for rotating said auxiliary screws mounted beneath said trough; driving connections on one end of each auxiliary screw; housings enclosing said driving connections and each partially projecting into said trough; a driving means housing transversely bridging said trough in vertically spaced relation to said feeder means and interconnecting said first-mentioned housings; and an endless transmission means connecting said driving means to said driving connections and extending through said housings.

References Cited in the file of this patent
UNITED STATES PATENTS

| | | |
|---|---|---|
| 1,668,324 | Kreisinger | May 1, 1928 |
| 1,745,938 | Lawder | Feb. 4, 1930 |
| 1,862,752 | Jones et al. | June 14, 1932 |
| 1,880,840 | Currier | Oct. 4, 1932 |
| 1,908,882 | Birkenbeutel | May 16, 1933 |
| 2,286,844 | Carter | June 16, 1942 |